United States Patent
Bachelder

(10) Patent No.: US 6,993,177 B1
(45) Date of Patent: Jan. 31, 2006

(54) GAUGING BASED ON GLOBAL ALIGNMENT AND SUB-MODELS

(75) Inventor: Ivan Bachelder, Newton, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 660 days.

(21) Appl. No.: 10/000,413

(22) Filed: Nov. 2, 2001

(51) Int. Cl.
  *G06K 9/00* (2006.01)

(52) U.S. Cl. ............... 382/151; 382/159; 382/190; 700/29; 703/2

(58) Field of Classification Search ........... 382/151, 382/103, 159, 154, 181, 155, 173, 190, 201, 382/206, 209, 276; 345/419, 427, 420, 619, 345/679, 680; 703/2; 700/29, 30; 701/59
See application file for complete search history.

(56) References Cited

U.S. PATENT DOCUMENTS

| | | | |
|---|---|---|---|
| 5,963,670 A * | 10/1999 | Lipson et al. | 382/224 |
| 5,995,652 A * | 11/1999 | Chiu et al. | 382/159 |
| 6,160,907 A * | 12/2000 | Robotham et al. | 382/154 |
| 6,324,299 B1 * | 11/2001 | Sarachik et al. | 382/151 |
| 6,411,734 B1 | 6/2002 | Bachelder et al. | |
| 6,424,734 B1 | 7/2002 | Roberts et al. | |
| 6,459,820 B1 * | 10/2002 | Sarachik | 382/286 |

OTHER PUBLICATIONS

Ivan A. Bachelder and Shimon Ullman, Contour Matching Using Local Affine Transformations, Massachusetts Institute of Technology Artificial Intelligence Laboratory, A.I. Memo No. 1326, Apr. 1992.

Cognex Corporation, Cognex MVS-8000 Series, CVL Vision Tools Guide, CVL 5.4 590-6271; Chapter 14, pp. 323-360.

Cognex Corporation, Cognex Checkpoint II, Tools Guide, Release 1.1, 590-6299, Chapter 12, pp. 197-202.

\* cited by examiner

*Primary Examiner*—Sheela Chawan

(57) ABSTRACT

A method for accurately and efficiently determining the location of points or entities in a machine vision image. A set of sub-models are constructed from a global training model representing objects viewed by the machine vision system. The set of sub-models are used to fix the actual location of user selected points or entities. Configuration of the sub-models is automated to ensure that the sub-models contain sufficiently stable features within optimally sized regions without requiring substantial user expertise. Located entities are compared to evaluate compliance with pre-selected tolerances.

12 Claims, 7 Drawing Sheets

GAUGING BASED ON GLOBAL ALIGNMENT AND SUB-MODELS

FIELD OF THE INVENTION

This invention relates generally to machine vision and more particularly to analyzing image data in machine vision systems.

BACKGROUND OF THE INVENTION

Machine vision images are made up of numerical arrays of data defining a color or gray level intensity for each pixel in a two dimensional grid. Industrial machine vision inspection systems typically employ gray level vision. In such systems, the gray level or light intensity level of each pixel is represented by a number from 0 to 255. Image analysis software tools are used to extract meaningful information from raw image data.

Various methods have been developed to recognize patterns, feature edges and contours for recognizing features or objects within an image.

One image analysis tool that is widely known for use in industry is called blob analysis. A blob analysis tool classifies image pixels as belonging to either an object or background and then joins the groups of pixels in each classification to represent discrete objects. The various moments of the connected objects are computed to determine the object's position, size and orientation. Blob tools can perform high speed image analysis with subpixel accuracy when used with images that include very little noise. However, the presence of touching or overlapping objects in an image and/or noise or image degradation prevents blob analysis tools from discriminating objects for inspection or identification. The range of potential applications for blob analysis is severely limited because the method of separating objects from backgrounds can only be performed in practice when objects of interest are either entirely brighter or entirely darker than the background.

Another common method of image analysis used in industry is referred to as template matching. Template matching methods require a training step wherein a model image or template of objects to be located is generated and stored. At run time, the template is compared with like-sized subsets of the image over a range of positions. The position having a greater match with the template is determined to be the position of the object in an image. A numeric representation of the degree of match can be generated and used for inspection purposes.

Early versions of template matching tools reassigned the value of each pixel to one of two states: bright or dark, with reference to a somewhat arbitrary threshold so that comparison operations were practical using processors that were available at the time. The thresholding step made subpixel accuracy impractical, by requiring machine operators to choose threshold values, and made results highly susceptible to variations in illumination and object reflectivity.

As faster processors became available, the limitations of template matching were overcome by using normalized correlation for the template comparison operation. Normalized gray scale correlation involves moving a gray scale image representing the object over the image in which the object must be found in order to determine a correlation peak indicating both the location of the object and the degree of match. Normalized correlation methods do not require objects to be separated from their background by brightness and are very tolerant of various forms of image degradation. Normalized correlation also tolerates touching or overlapping objects in an image.

Due to its advantages over template matching and blob analysis, normalized correlation methods became the dominant method for pattern matching in industry and in particular in the semiconductor manufacturing and electronics assembly fields. Unlike blob analysis, however, normalized correlation methods do not have the ability to tolerate and measure variations in orientation and size. Variations of a few degrees of rotation or a few percent in object size will cause normalized correlation methods to render inaccurate results.

The normalized correlation method also suffers diminished performance when used to identify 3-D objects in an image. This performance degradation is due to shading variations that depend on illumination direction, target surface orientations and shadows. These limitations make normalized correlation methods unsuitable for use in typical robotic assembly equipment where recognition of 3-D objects is required.

A method of geometric pattern matching was developed to overcome the limitations of normalized correlation by representing objects as geometric shapes independent of shading and independent of a discrete grid. The geometric pattern matching method can tolerate and measure wide variations in orientation and size of objects in an image, can be performed with high speed and high accuracy, and is able to tolerate severe shading variations. An exemplary geometric pattern matching tool called PatMax is available from Cognex Corporation of Natick, Mass.

The geometric pattern matching technology used in Pat-Max includes algorithms for feature detection, training, affine searching, pose refinement, and inspection. Feature detection produces a geometric description of object boundaries as an ordered list of boundary points that lie along contours separating dissimilar regions in the image. Unlike traditional edge detection, which simply marks certain pixels as edges, each boundary point specifies positions and orientation as real valued coordinates. PatMax uses a range of granularity that is appropriate for each particular image. Geometric descriptions of objects only make sense when the proper granularity is chosen. By selecting the appropriate granularity, PatMax is able to find objects whose edges may be discontinuous at a granularity which would make use of a traditional edge detector impossible.

PatMax performs a training procedure to choose the range of granularity that makes sense for objects to be found and then to select features at each of the various chosen granularities to represent the object. The task of choosing granularities and selecting features during a training procedure is quite challenging and can be a source of considerable error when humans make these choices. PatMax fully automates these tasks and allows human overrides only as a last resort for unusual cases.

The geometric descriptions of objects produced by feature detection can be translated, rotated, scaled, stretched and otherwise transformed with no loss in fidelity. PatMax uses a six degree of freedom affine transform which includes two degrees of freedom of translation and one each of rotation, scale, aspect ratio and skew. Each non-translation degree of freedom is specified as either a fixed value or a range of values to be searched. A fixed value for a degree of freedom allows a transformed version of the trained pattern to be found with no time penalty and no need to train extra patterns. For example, a single square pattern can be trained and used to find rectangular objects at a variety of known sizes and shapes by setting appropriate fixed values for the scale degrees of freedom.

PatMax next performs a pose refinement algorithm to compute translation, orientation and scale of an object to extremely high accuracy. Algorithms such as those used by PatMax that locate objects having various scales and orientations are commonly referred to as RISI (rotation invariant scale invariant) tools.

In order to recognize an object in an image, analysis tools, such as PatMax, must first be trained by acquiring and storing a model of a representative object. The model can be developed as an image of an actual object or can be synthetically constructed using CAD tools. During run time operation, the machine vision system acquires an image that may include the object of interest at any scale or orientation relative to the viewing device. The analysis tools will recognize the object in the image and compute the degree of rotation, scale and translation of the object in the image relative to the trained model. This computation is sometimes referred to as an alignment of the object.

It is often desirable to verify that specified dimensions of an object as measured in the image following an alignment are within pre-specified ranges. These measurements commonly referred to as gauging are typically performed by extracting pairs of feature positions in the image for example by manually placing caliper tools, or by using a search method to locate distinctive patterns, and then measuring the distance between the pairs in order to compare them to allowed ranges.

One known method of measuring the distance between pairs in a machine vision image can be performed using CALIPER TOOLS™ available from Cognex Corporation of Natick, Mass. CALIPER TOOLS™ is a vision tool for measuring the width of objects, the location of edges or features, and the location and spacing of pairs of edges in images. CALIPER TOOLS™ differs from other vision tools in that it requires users to know the approximate location and characteristics of the feature or edges that are to be located or measured. CALIPER TOOLS™ is typically used to develop detailed information about the locations of features within an object.

CALIPER TOOLS™ supports two methods of locating edges or edge pairs in an image: an edge mode in which edge peaks are detected using a simple 1-D kernel; and a correlation mode in which correlation peaks between a 1-D sample image and a 1-D reference image are located. Once a user has determined the location and orientation of the edge or edge pair of interest within an image he must perform the following steps to apply CALIPER TOOLS™. First, the user must specify a region enclosing the edges or edge pairs of interest. Then, for edge mode, the user must select a filter size and contrast threshold that isolates the edges of interest and define an edge model that describes the edge or edge pair of interest. For correlation mode, the user must supply a one-dimensional reference image. For either mode, the user must define the scoring methods for scoring edge pattern candidates within the image. Finally, the user can apply CALIPER TOOLS™ and interpret the results.

Another Cognex product, called Checkpoint, provides various tools like a caliper for measuring points and lines, gauging tools for verifying point-point and point-line distances and tools for gauging angles and arcs. The Checkpoint tools also allow the user to set tolerances on distances between points and lines that are measured using other vision tools.

Another software tool, called Sherlock, available from Coreco Imaging Inc. of Bedford Mass., can be used to perform caliper type measurements of distances between points in an image.

Various RISI inspection tools have also been used to perform gauging by determining a linear mapping from the object to the image, interpolating to estimate specified gauging points and computing the distance between those points. The linear interpolation approach only works well for rigid 2D objects that translate within the imaging plane, rotate about the line of sight, or scale due to movement along the line of sight. Rotations of 2D objects out of the imaging plane, or 3D objects undergoing arbitrary translation with no rotation out of the plane, can only be described by a linear transformation when the imaging optics approximate an orthographic projection with scale, which typically occurs only when the object is at a large distance from the imaging system relative to its size. A known (pre-measured) calibration mapping might be used to extend the capabilities of linear interpolation by correcting for perspective effects; however, non-linear deformations of the objects, such as those due to manufacturing variances, cannot be corrected by such methods.

Gauging has also been performed by applying separate alignment tools to find object features then measuring the distance between them. For example, Cognex Checkpoint tools and another Cognex product called Insight both require users to perform gauging in this manner. The method of applying separate alignment tools to find object features disadvantageously requires users to manually choose stable alignment models for the portions of the object from which gauging points are measured. This method requires the configuration of additional vision tools in an application specific fashion and usually requires extensive knowledge of machine vision, especially when the features of interest do not lie directly on any stable portions.

Another method of gauging has been performed by aligning pre-defined sub-models of an object by specifying "salient dimensions" of the object as defined in U.S. patent application Ser. No. 09/054,968 by Sarachik, Bachelder, Marrion and Chang (hereinafter referred to as "the Sarachik Application") which is hereby incorporated by reference in its entirety.

The Sarachik Application discloses a method of locating an object within a client region, where the object has a plurality of portions. The method includes defining a full geometric model of the object; defining a plurality of geometric sub-models of the object; determining coarse candidate poses of the object within the region using an image of the region and the full geometric model of the object; determining the fine pose of each of a plurality of portions of the object using the coarse candidate poses of the object within the region, and at least some of said geometric sub-models, to provide a plurality of object portion fine poses within the region; and then determining the fine poses of the object within the region using said plurality of object portion fine poses. The invention disclosed in the Sarachik Application allows geometric descriptions of objects (such as resistor chips, ball grid array packages, flip chips, etc.) to be specified in an arbitrary coordinate system, such as a physical (real world) coordinate system. This allows the same model to be used when locating the object within the physical world over a wide range of imaging conditions. The invention provides a powerful method for finding objects in images that is efficient in both memory space and computational time. This technique, however, is limited to locating geometric sub-models of an object when the approximate pose of the object is already known. Furthermore, it provides no method for automatically determining a set of sub-models for an object so that gauging can be performed.

U.S. patent application Ser. No. 09/212,844 entitled "Improved Object Image Search Using Validated Sub-Model Poses" by Bachelder and Sarachik (hereinafter referred to as "the Bachelder Application") which is hereby incorporated by reference in its entirety discloses refinements to the method taught by the Sarachik Application.

The Bachelder Application discloses a method for finding a pose of a geometric model of an object within an image of a scene containing the object that includes providing sub-models of the geometric model; and providing found poses of the sub-models in the image. The method also includes selecting sub-models of the geometric model based on pre-fit selection criteria and/or post-fit selection criteria so as to provide selected sub-models of the geometric model. Thus, the invention disclosed in the Bachelder Application automatically removes, disqualifies, or disables found sub-model poses when they fail to satisfy certain user-specified requirements. Examples of such requirements include thresholds on deviations between the found sub-model pose, as well as limits on the sub-model. The remaining, validated sub-models can then be used to re-compute a more accurate fit of the model to the image. The method can also ensure that the new fit conforms to user-specified requirements, such as requiring that skew or aspect components of the final model pose be below some user-specified threshold. The invention disclosed in the Bachelder application not only allows sub-model outliers to be discarded so as to obtain a more close-fitting model pose, but also reduces the possibility of "false positives", i.e., returning a model pose when the model does not exist within the image.

U.S. patent application Ser. No. 09/285,626 entitled "Fiducial Mark Search Using Sub-Models" by Roberts and Sarachik (hereinafter referred to as "the Roberts Application") which is hereby incorporated by reference in its entirety also provides further refinement to the methods taught by the Sarachik Application.

The Roberts Application discloses a method for finding a pose of a geometric model of a fiducial mark within an image of a scene containing the fiducial mark. The method includes receiving input from a user including geometric model shape information and geometric model dimensions, selecting a pre-defined model being parameterized by the geometric model dimensions; and then using the pre-defined model to find an image of the fiducial mark in the image of the scene. The act of selecting a pre-defined model having sub-models includes pre-defining a model such that the sub-models and the relationships among the sub-models are selected by exploiting knowledge of features and properties of the fiducial sought so as to provide more accurate location of the fiducial. The invention disclosed in the Roberts Application provides enhanced ease of use of a sub-model based search method by requiring only the shape and dimensions of the fiducial sought. An appropriate model and its sub-models are automatically provided. The model and its sub-models are particularly appropriate to the application when they are based on knowledge of the variability of the fiducial and other aspects of the behavior of the fiducial throughout a manufacturing process, for example.

U.S. patent application Ser. No. 09/140,124 to Sarachik entitled Gauging Using Sub-Model Poses which is hereby incorporated by reference disclosed the use of sub-models to perform gauging. However the method disclosed by this application simplistically requires manual specification of sub-models for each gauging point.

Each of the referenced U.S. patent applications discloses methods that require substantial user knowledge of vision systems to select and evaluate various sub-models and/or sub-model parameters. Such knowledge is beyond that which should be required to perform simple gauging tasks. The human input required by these methods creates opportunity for error and increases the time and expense of making machine vision gauging measurements.

SUMMARY OF THE INVENTION

This invention overcomes limitations of the prior art by providing a method for automatically selecting and aligning a set of optimal sub-models within an alignment model. The sub-models are optimized to reference the location of a set of gauge points or other entities in an image for which gauging is to be performed. The sub-models are aligned, for example using RISI tools, to identify their pose, i.e., their rotation, translation and scale, so that accurate measurements of the gauging points can be made. Then the found sub-model positions are used to interpolate the actual locations of the gauge points.

According to an illustrative embodiment of the invention, a training image or CAD model of an object is first acquired during a training procedure. A set of points, other shapes or entities (hereinafter referred to as "gauge points") is then specified using an editor tool. Allowable location tolerances (ranges) can be specified between pairs of gauge points. Each gauge point is then automatically associated with distinctive features such as edges in the training image so that the gauge points can be accurately localized later in a run time image.

In an illustrative embodiment of the invention, the distinctive features are automatically selected by evaluating progressively larger regions around each gauging point for the presence of stable features. Assessment of the various sized regions is performed by segmenting each region into contiguous portions containing features such as edges. For each portion, stability of the features is mathematically assessed within the context of an alignment tool.

The stability of a feature is a function of the alignment tool that is used and the degrees of freedom that are enabled. Specifically, the ability to interpolate the position of each gauge point is assessed to within a specified accuracy using the poses of these features as determined by an alignment tool with knowledge of the expected uncertainty of the determined poses. The stability of each region is assessed using only those features that are determined to be stable above some threshold. The smallest regions, hereinafter referred to as "optimal regions" that have an optimal number of stable features within sufficiently close proximity to the respective gauge point are identified. Although the features selected will typically be proximate to the gauge points, they may also be located at some distance, for instance, when the local area is devoid of distinctive features.

Next, to complete the training procedure, a sub-model is constructed for each gauge point. The sub-models include the sufficiently stable features in the respective optimal regions.

At run time, the global model is used to obtain a global alignment in a run time image. Then the global alignment is used to determine the approximate sub-model locations in the run time image. Next, each of the sub-models is located in the run-time image using any of several methods. The location of each gauge point is then interpolated using the found poses of its supporting sub-models. Finally, the relative locations of each gauge point can be calculated to determine whether the gauge point locations fall within specified tolerances.

The present invention features automatic selection of stable features and regions for constructing sub-models by automatically assessing the stability of the relevant features and regions with respect to the alignment tool being used and the selected degrees of freedom. The invention thereby overcomes many limitations of the prior art and provides a mathematically stable way to robustly and accurately measure feature locations despite the absence of nearby stable features in an image. The invention advantageously allows gauging to be performed accurately within the context of a single alignment tool without requiring extensive operator knowledge of machine vision systems and substantially reduces operator workload during the training phase.

BRIEF DESCRIPTION OF DRAWINGS

The accompanying drawings, referred to herein and constituting a part hereof, illustrate the exemplary embodiments of the system and method of the present invention and, together with the description, serve to explain the principals of the invention.

DETAILED DESCRIPTION

Figure 1:
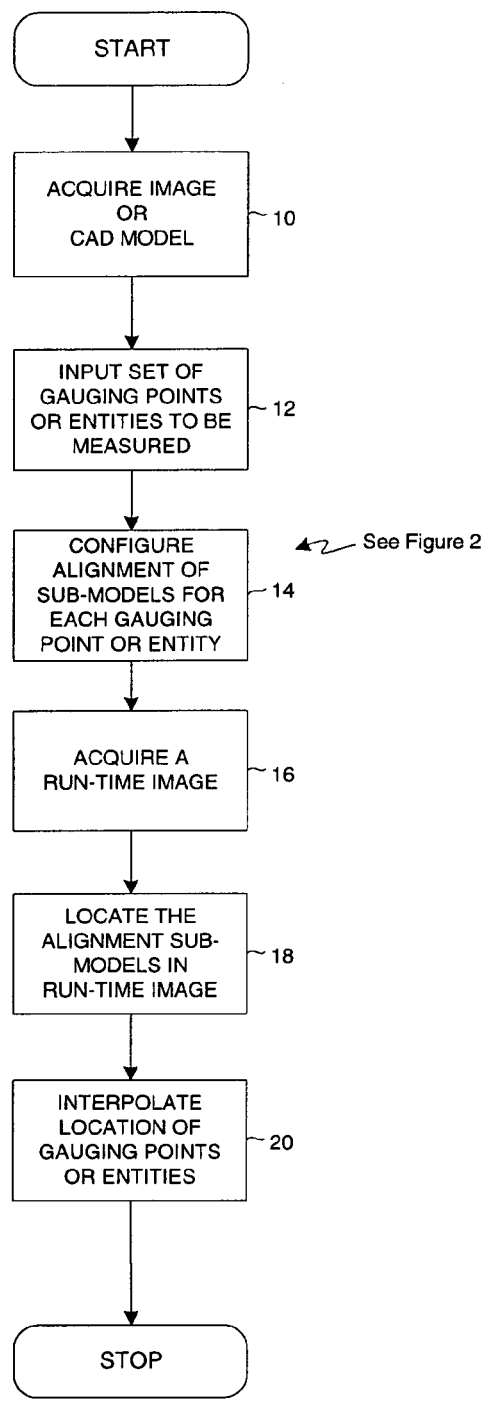
FIG. 1 is a flow chart of the steps performed to implement at least one embodiment of the present invention.

FIG. 1 illustrates the general steps performed to implement at least one embodiment of the invention. A model acquisition step 10 is first performed in which a training image is acquired or a CAD model is constructed. The training image or CAD model includes gauge points or entities whose location is to be measured. A model typically consists of a spatial arrangement of features that can be related in space to the gauge points or entities. The gauge points or entities may be points, lines or objects whose position is of interest to the user and which have positions that lie within the model. The gauge points or entities are defined by the user during a gauge entity definition step 12 which usually occurs at set up time or training time. The gauge entities can be selected, for example, by selecting points with the cursor in a graphical user interface.

A configuration of sub-models step 14 is then performed. During the configuration of sub-models step 14, sub-models or features associated with each gauge point or entity are automatically chosen. Once the sub-models have been selected, the training phase is complete.

When a trained vision system is ready to run in a field application, i.e. at run-time, an image acquisition step 16 is first performed. The run time image is acquired by an image acquisition device such as a camera in the machine vision system. A sub-model locating step 18 is then performed in which the alignment sub-models for each gauging point or entity are located in the run time image. Finally, a gauge entity locating step 20 is performed in which the location of gauge points or entities is interpolated with reference to the aligned sub-models in the run time image. Any of various methods of interpolation known to those skilled in the art may be implemented.

Figure 2:
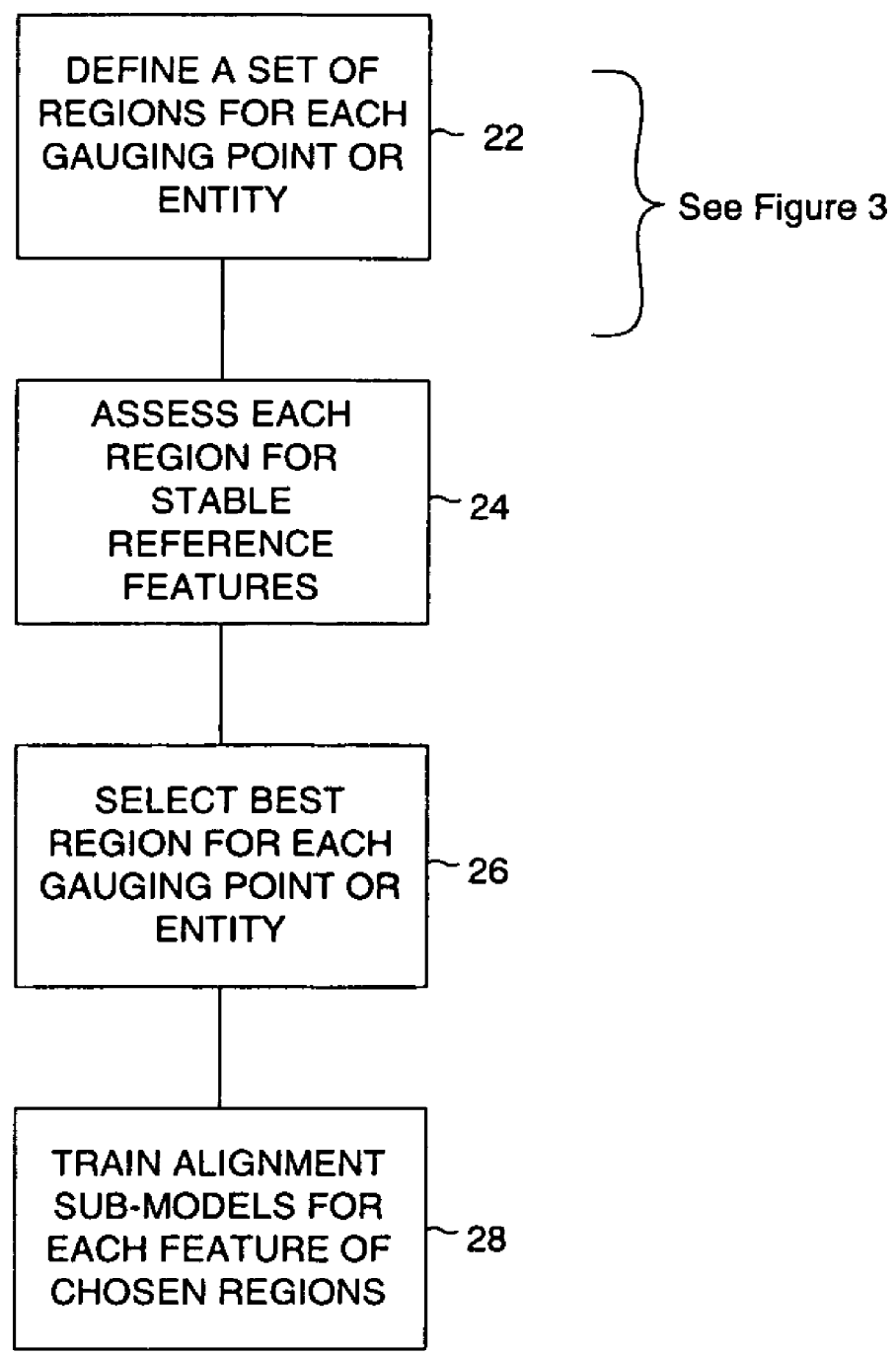
FIG. 2 is a flow chart of the steps performed to configure alignment of sub-models for each gauge point or entity according to at least one embodiment of the present invention.

FIG. 2 further defines the configuration of sub-models step 14. First a region definition step 22 is performed during which a set of regions is defined for each gauge point or entity. Next a region assessment step 24 is performed. During the region assessment step, each region is assessed for stable reference features. A region selection step 26 is then performed to select the best region having sufficiently stable features from which to reference respective gauge point or entity. Finally, a sub-model definition step 28 is performed in which alignment sub-models are trained for each sufficiently stable feature of the selected regions. The region definition step 22 and region assessment step 24 are set forth in more detail in FIG. 3. Once the set of regions is defined for each gauging point or entity, a segmentation step 30 is performed wherein each region is segmented into contiguous portions containing features. Next, a portion stability assessment step 32 is performed in which the stability of each portion containing features in each region is mathematically assessed. Finally, a region stability assessment step 34 is performed during which the stability of each region is determined using only the portions in those regions that were determined to be sufficiently stable.

Figure 4:
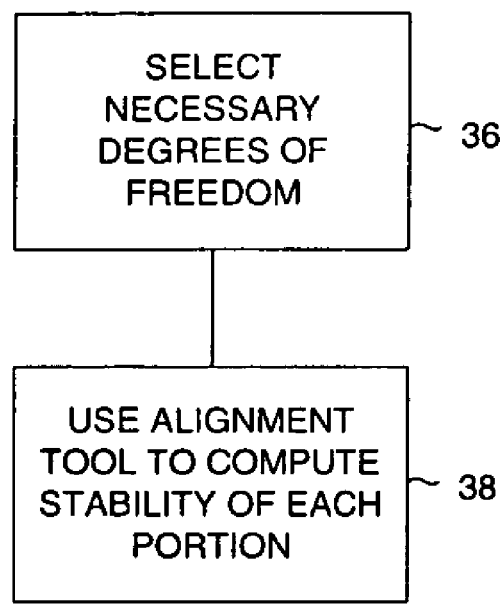
FIG. 4 is a flow chart of the steps performed to assess stability of each portion within a region using an alignment tool according to at least one embodiment of the present invention.
Figure 7:
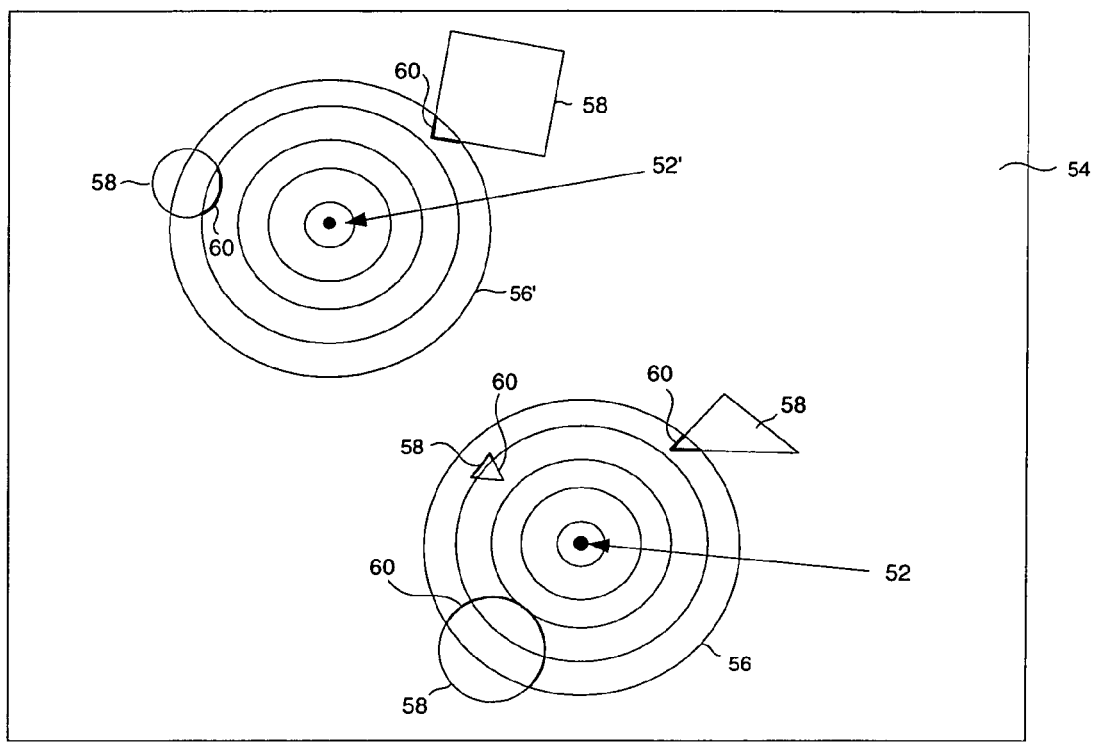
FIG. 7 is a graphical representation of a set of concentric regions surrounding a gauge point and encompassing a plurality of reference features according to at least one embodiment of the present invention.

The portion stability assessment step 32 can be performed using an alignment tool as shown in FIG. 4. First, a degree of freedom analysis step 36 is performed during which the necessary degrees of freedom are determined for measuring the gauging point or entity with respect to the particular geometry of the stable features within portions of each region. Then a stability computation step 38 is performed wherein an alignment tool is used to compute the stability of each portion as shown in the diagram of FIG. 7.

Figure 5:
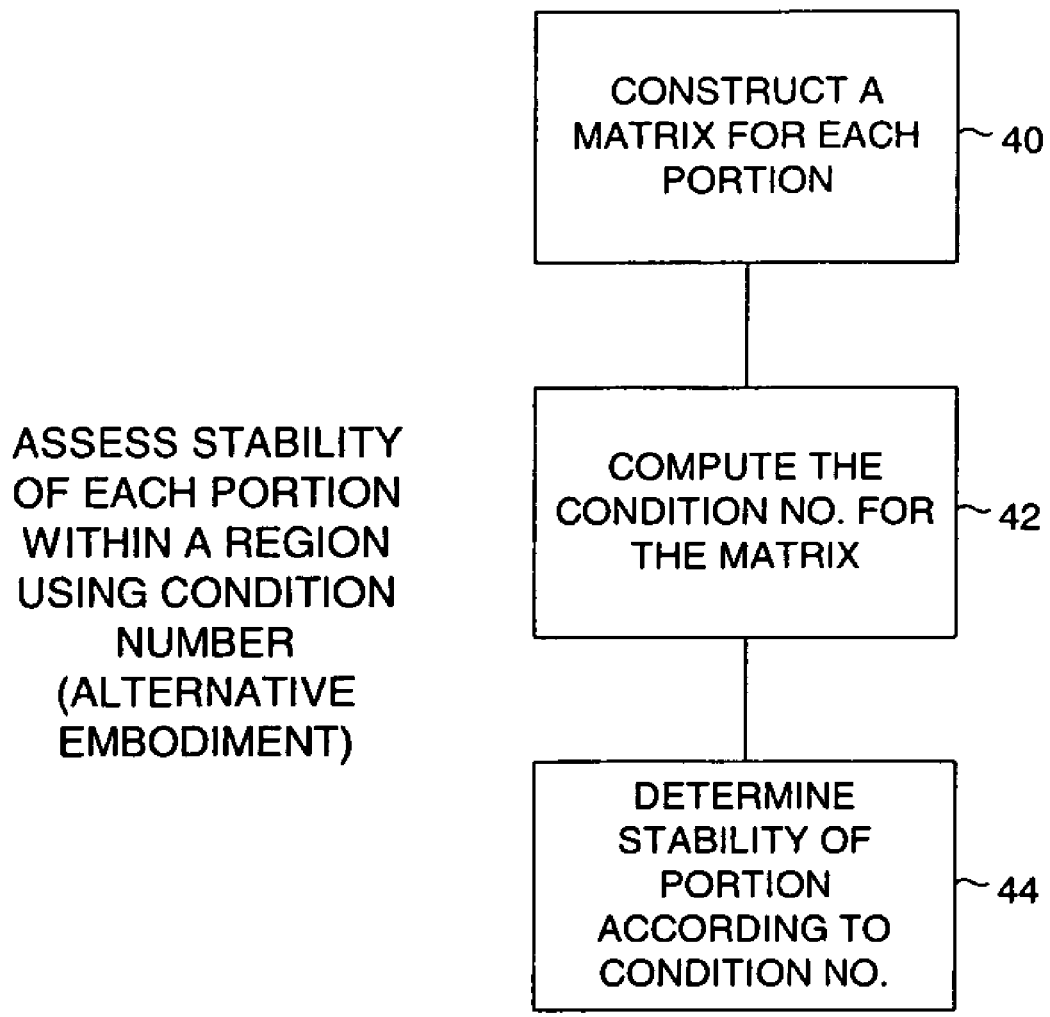
FIG. 5 is a flow chart of the steps performed to assess stability of each portion within a region using a condition number according to at least one embodiment of the present invention.

According to an alternative method as set forth in FIG. 5, a matrix construction step 40 is first performed. During the matrix construction step 40, a portion definition matrix is constructed for each portion. The system of equations that define the portion definition matrix is based on the construction of point-line constraints along edge contours. That is, each contour point on the model (in this case, sub-model) is known to correspond to a line in the image to which a match is hypothesized. One method for determining a corresponding line for a point on the model is to take the line that is tangent to the closest edge point in the image. Applications of this technique for determining a sub-model are somewhat complicated because the technique must operate on the model without reference to any run-time image. However, the stability can still be determined by using the model itself as the run time image (that is, the model can be matched to itself). Each point along the model has a corresponding line that is the tangent to the model gradient at that point. See Ivan A. Bachelder, *Contour Matching Using Local Affine Transformations* (1991), M.S. Thesis, Massachusetts Institute of Technology.

First, according to this method, a tangent line or slope is determined at each point along the contour (geometric contour in the case of CAD, or edge contour in the case of image) in the sub-model. Next, the system of equations Ax=b constraining the components of the linear six degrees of freedom transformation using the point-line correspondences is set up. These components include translation (x and y), rotation, uniform scale, skew, and aspect (stretch). Note that it is possible to limit these degrees of freedom (e.g., to only translation and rotation), which would result in a different set of equations. Then the condition number of $(A^T)A$ is determined in order to find whether the sub-model is a stable choice for the given degrees of freedom.

The matrix encodes the amount of detail in the model. The less detail a model includes, the more unstable it will be. For example, if the sub-model were simply a line, then the matrix would be completely unstable because there would be an infinite number of translations along the line that could result in a perfect match (if we ignored the end-points of the line). If the model were a non-equilateral triangle, on the other hand, then all degrees of freedom would be constrained (there is only one way to match the triangle to itself).

Next, a computation step 42 is performed wherein the condition number is computed for each matrix. This method is tied to the standard method of leastsquares, which can be posed as a method for solving a generally over constrained system of equations Ax=b (where A is a matrix, b is a vector, and x is a vector of unknowns). The method always involves solving $(A^T)Ax=(A^T)b$, where $A^T$ is the transpose of A. When the system of equations is unstable, the square matrix $(A^T)A$ will be nearly singular. The condition number of this square matrix can be used to determine instability. Finally, a condition number evaluation step 43 is performed to determine the stability of each portion according to the condition number of its respective matrix.

Figure 3:
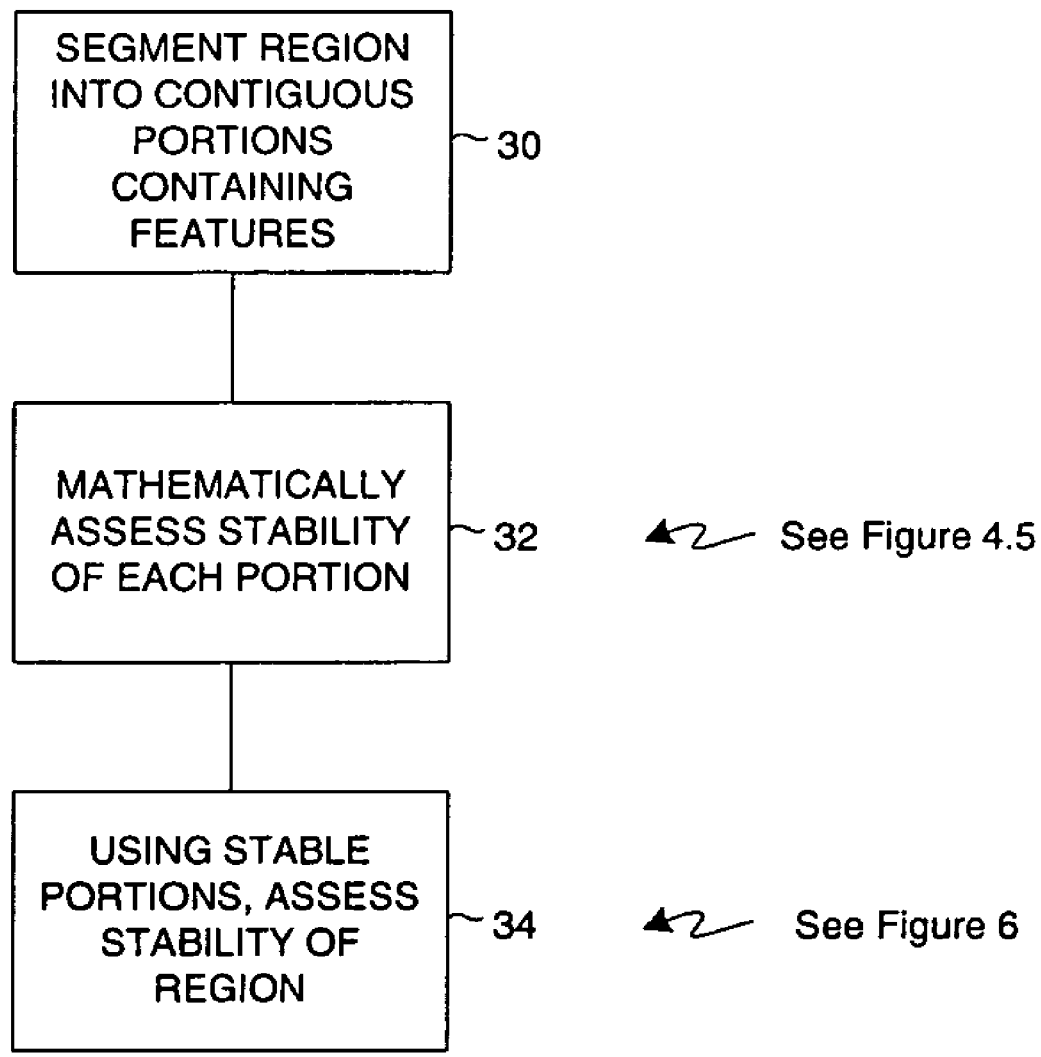
FIG. 3 is a flow chart of the steps performed to assess each region for stable reference features according to at least one embodiment of the present invention.
Figure 6:
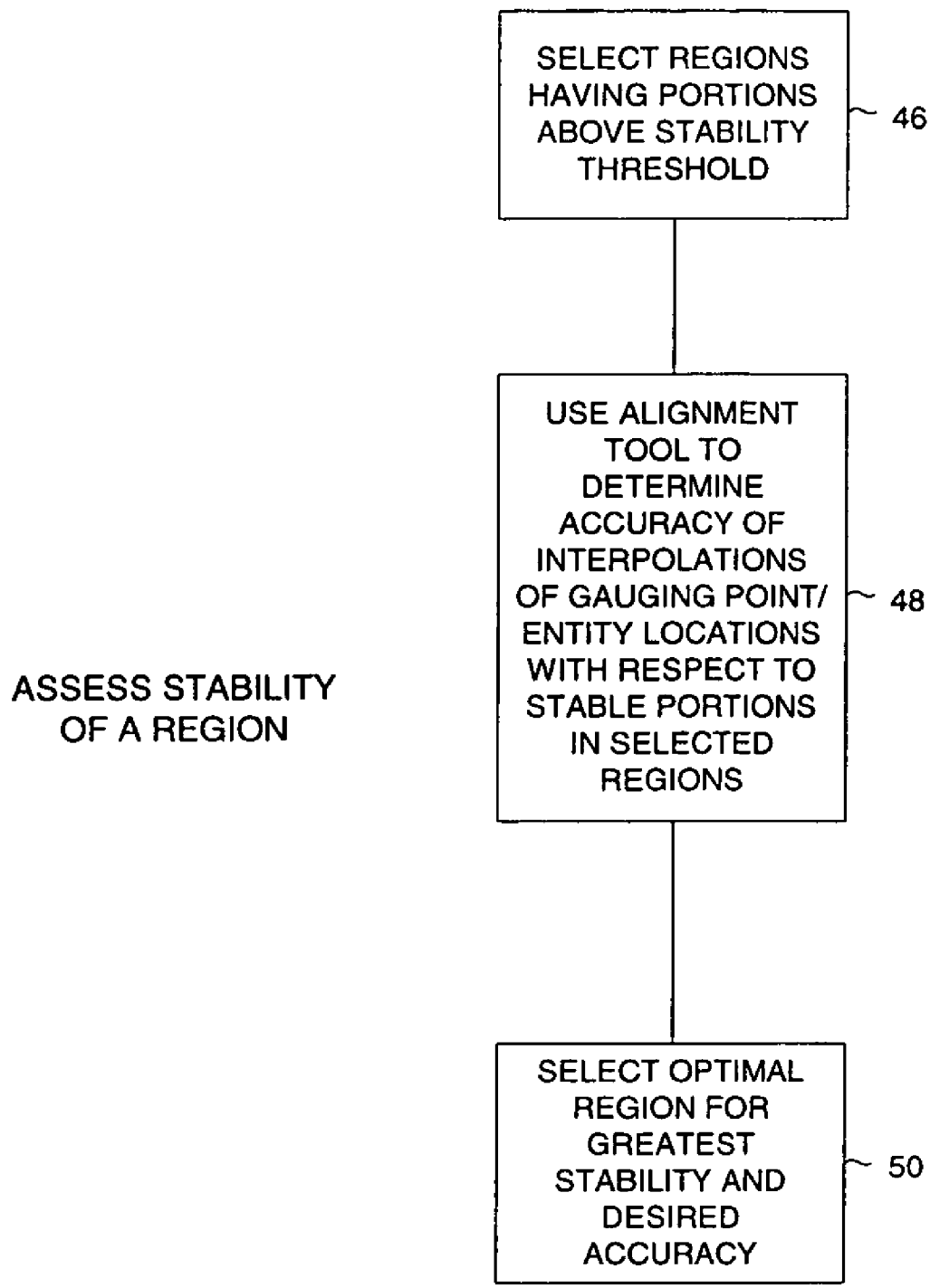
FIG. 6 is a flow chart of the steps performed to assess stability of a region using stable portions according to at least one embodiment of the present invention.

The region stability assessment step 34 shown in FIG. 3 is diagramed in more detail in FIG. 6. A region screening step 46 is first performed to assess the stability of a region. During the region screening step, regions having portions above a predetermined stability threshold are selected. Next, an accuracy evaluation step 48 is performed. During the accuracy evaluation step 48 an alignment tool can be used to determine the accuracy of interpolations of the gauging points or entity locations with respect to the stable portions in the selected regions. Finally, a region selection step 50 is performed to select the optimal region having the greatest stability and desired accuracy for measuring the location of the gauging points or entities.

FIG. 7 illustrates two gauging points 52, 52' in an image 54. Each gauging point 52, 52' is surrounded by a set of concentric regions 56, 56'. Features 58 are shown as circles, rectangles and triangles which intersect the regions 56. Portions 60 of features 58 comprise pieces of features 58 which fall inside the various regions 56.

An illustrative embodiment of the present invention can be implemented using PatMax alignment algorithms. In this illustrative embodiment, a vision system is first trained with a global model using PatMax. A user then identifies a pair or set of gauge points or gauge entities to be located. In one illustrative embodiment, the user is presented with an image of the global model on computer screen, and selects the gauge points using a mouse. In another embodiment the gauge points or entities can be selected using the same CAD tools that had previously been used to generate a synthetic global model. Finally the user may input an acceptable tolerance around the absolute positions of gauge entities or around the relative positions of related gauge points or entities.

At run time an implementation of the invention first locates the global model in the run-time image. Next, the rough location of each gauge entity is calculated using a training image. In the illustrative embodiment, a small circle centered about each rough location is defined as the initial region around each gauge entity. Each initial region is segmented according to any number of segmentation methods known in the art to identify features such as edges in the region. Then PatMax alignment tools are implemented to attempt to align the gauge entity with respect to the features in the respective initial region. The PatMax alignment tool outputs numerical data that categorizes the stability of the gauge entity with respect to the features in the respective region. The numerical data includes a matching score (the lower the score, the less stable the result) and a number of candidate matches (there should be one for a stable model: if none, the matching is probably under constrained; if more than one, there are probably too many possible matches).

If the stability of the features within a region falls within a pre-selected stability threshold then the region is designated as an optimal region. If a region does not contain sufficiently stable features for locating the respective gauge entity, then incrementally larger regions are similarly evaluated until a sufficiently stable optimal region is identified. In the illustrative embodiment a sub-model for each gauge entity comprises the sufficiently stable features in the optimal region around that gauge entity.

Once a sub-model is constructed for each gauge entity, PatMax alignment tools are implemented using the sub-model to calculate a very accurate location of the gauge entity relative to the sub-model. The calculated accurate locations of selected gauge entities are then compared to determine whether the relative locations of gauge entities falls with pre-selected tolerances.

Although illustrative embodiments of the invention are described herein in terms of gauge points, it should be understood by persons of ordinary skill in the vision systems arts that that the gauge entities that are located according to the present invention can be, points, lines, arcs or any number of various features that can be commonly located using machine vision systems.

Although the invention is described herein in terms of PatMax alignment tools, it should be understood by persons of ordinary skill in the vision systems arts that any number of known vision system tools can be used to evaluate the stability of various features and regions and to thereby provide data for the automatic construction of optimal sub-models according to the present invention. For example, HexSight™ by HexaVision Technologies Inc. of Sainte-Foy, Quebec, Canada and SMARTSearch by Coreco Imaging Inc. can be used to provide data for automatic construction of sub-models.

Although illustrative embodiments of the invention are described herein in terms of determining stability of various features and regions with reference to various alignment tools, it should be understood by persons having ordinary skill in the vision systems arts that stability of features may be evaluated according to the invention by any number of mathematical methods, without reference to any alignment tools. For example the stability of the various features and regions can be determined using any number of mathematical methods such as by evaluating the condition number of the stability matrix.

Although illustrative embodiment of the invention are described herein in terms regions comprising a set of progressively larger concentric circles around the gauge points, it should be understood by persons having ordinary skill in the vision system arts that any number of region sets can be defined arbitrarily or according to a predetermined assessment of locations of likely stable features without departing from the spirit and scope of the present invention. For example, where the gauge entity is a line, a series of progressively larger nested ellipses having major axis along the line may more efficiently locate sufficiently stable features.

Although the invention has been shown and described with respect to exemplary embodiments thereof, various other changes, omissions and additions in the form and detail thereof may be made therein without departing from the spirit and scope of the invention.

What is claimed is:

1. A method of gauging entities in an image comprising the steps of:
   constructing a model data structure;
   identifying a set of gauge entities in said model;
   automatically configuring sub-models according to the stability of features in said sub-models for computing position of each of said gauge entities by:
     defining a set of regions for each gauge entity;
     assessing each region for stable reference features;
     selecting a best region for each gauge entity; and
     training a sub-model representing each feature that exceeds a predetermined stability threshold within each of said best regions;
   locating said sub-models in said image;
   computing positions of each of said gauge entities by reference to locations of located sub-models; and
   determining the spatial relationship between said gauge entities.

2. The method according to claim 1 wherein the step of assessing each region further comprises the steps of:
   segmenting each region into contiguous portions containing features;
   mathematically assessing the stability of each portion; and
   assessing the stability of each region according to the stability of portions within its respective region that exceed a predetermined stability threshold.

3. The method according to claim 2 wherein the step of mathematically assessing the stability of each portion further comprises the steps of:
   selecting degrees of freedom required to compute the spatial relationship of particular gauge entities with respect to the respective feature; and
   invoking an alignment tool to compute the stability of each feature for determining the spatial relationship of said gauge entity with respect to said respective feature and said degrees of freedom.

4. The method according to claim 2 wherein the step of mathematically assessing the stability of each portion further comprises the steps of:
   constructing a portion stability matrix for each portion;
   computing a condition number for said matrix; and
   determining the stability of each portion according to said condition number.

5. A method of gauging entities in an image comprising the steps of:
   constructing a model data structure;
   identifying a set of gauge entities in said model;
   automatically configuring sub-models according to the stability of features in said sub-models for computing position of each of said gauge entities;
   locating said sub-models in said image;
   computing positions of each of said gauge entities by reference to locations of located sub-models by interpolation with reference to said located sub-models; and
   determining the spatial relationship between said gauge entities.

6. An apparatus for gauging entities in an image comprising:
   an image acquisition device; and
   an image analysis system in communication with said image acquisition device wherein said image analysis system operates on an acquired image to determine spatial relationship between gauge entities by:
     automatically configuring sub-models according to stability of features in said sub-models for computing position of each of said gauge entities by:
       defining a set of regions for each gauge entity;
       assessing each region for stable reference features;
       selecting a best region for each gauge entity; and
       training a sub-model representing each feature that exceeds a predetermined stability threshold within each of said best regions;
     locating sub-models in said image; and
     computing positions of said gauge entities by reference to locations of located sub-models.

7. The apparatus according to claim 6 wherein said image analysis system assesses each region by:
   segmenting each region into contiguous portions containing features;
   mathematically assessing the stability of each portion; and
   assessing the stability of each region according to the stability of portions within its respective region that exceeds a predetermined stability threshold.

8. The apparatus according to claim 7 wherein said image analysis system mathematically asses the stability of each portion by:
   selecting degrees of freedom required to compute the spatial relationship of particular gauge entities with respect to the respective feature; and
   invoking an alignment tool to compute the stability of each feature for determining the spatial relationship of said gauge entity with respect to said respective feature and said degrees of freedom.

9. The apparatus according to claim 7 wherein said image analysis system mathematically assesses the stability of each portion by:
   constructing a portion stability matrix for each potion;
   computing a condition number for said matrix; and
   determining the stability of each portion according to said condition number.

10. An apparatus for gauging entities in an image comprising:
    means for acquiring an image; and
    means for analyzing said image in communication with said means for acquiring an image wherein said means for analyzing said image operates on an acquired image to determine spatial relationships between gauge entities by:

automatically configuring sub-models according to stability of features in said sub-models for computing position of each of said gauge entities, by:
   defining a set of regions for each gauge entity;
   segmenting each region into contiguous portions containing features;
   mathematically assessing the stability of each portion; and
   assessing the stability of each region according to the stability of portions within its respective region that exceeds a predetermined threshold;
locating sub-models in said image; and
computing positions of sad gauge entities by reference to locations of located sub-models.

11. The apparatus according to claim 10 wherein said means for analyzing said image mathematically assesses the stability of each portion by:

selecting degrees of freedom required to compute the spatial relationship of particular gauge entities with respect to the respective feature; and
invoking an alignment tool to compute the stability of each feature for determining the spatial relationship of said gauge entity with respect to said respective feature and said degrees of freedom.

12. The apparatus according to claim 10 wherein said means for analyzing said image mathematically assesses the stability of each portion by:
   constructing a portion stability matrix for each portion;
   computing a condition number for said matrix; and
   determining the stability of each portion according to said condition number.

* * * * *